(12) United States Patent
Kwon et al.

(10) Patent No.: US 9,958,036 B2
(45) Date of Patent: May 1, 2018

(54) PLANETARY GEAR TRAIN OF AN AUTOMATIC TRANSMISSION FOR A VEHICLE

(71) Applicant: HYUNDAI MOTOR COMPANY, Seoul (KR)

(72) Inventors: Hyun Sik Kwon, Seoul (KR); Seong Wook Hwang, Gunpo-si (KR); Wonmin Cho, Hwaseong-si (KR); Jae Chang Kook, Hwaseong-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 15/367,882

(22) Filed: Dec. 2, 2016

(65) Prior Publication Data
US 2017/0268629 A1  Sep. 21, 2017

(30) Foreign Application Priority Data
Mar. 17, 2016  (KR) .......................... 10-2016-0032344

(51) Int. Cl.
*F16H 3/66*  (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC ............... F16H 3/66; F16H 2200/0065; F16H 2200/2012; F16H 2200/2046
See application file for complete search history.

(56) References Cited

U.S. PATENT DOCUMENTS 3,863,524 A * 2/1975 Mori .......................... F16H 3/66
                                                                 475/276
8,597,152 B2  12/2013 Seo et al.
(Continued)

FOREIGN PATENT DOCUMENTS

JP   WO2013146027   12/2015
KR   20120132021    12/2012

*Primary Examiner* — Stacey Fluhart
(74) *Attorney, Agent, or Firm* — Lempia Summerfield Katz LLC

(57) ABSTRACT

A planetary gear train of an automatic transmission for a vehicle includes: an input shaft receiving torque of an engine; an output shaft outputting the torque; a first planetary gear set including a first, a second, and a third rotation element; a second planetary gear set including a fourth, a fifth, and a sixth rotation element; a third planetary gear set including a seventh, an eighth, and a ninth rotation element; and a fourth planetary gear set including a tenth, an eleventh, and a twelfth rotation element. The gear train includes a first shaft connected to the first rotation element; a second shaft connecting the second rotation element to the fourth rotation element and the seventh rotation element and connected to the input shaft; a third shaft connecting the third rotation element to the eleventh rotation element; a fourth shaft connecting the fifth rotation element to the twelfth rotation element and connected to the output shaft; a fifth shaft connected to the sixth rotation element and selectively connected to the third shaft; a sixth shaft connected to the eighth rotation element; a seventh shaft connected to the ninth rotation element; and an eighth shaft connected to the tenth rotation element, selectively connected to the sixth shaft, and selectively connected to the seventh shaft.

20 Claims, 2 Drawing Sheets

(56) References Cited

U.S. PATENT DOCUMENTS

| | | |
|---|---|---|
| 9,182,014 B2 | 11/2015 | Beck et al. |
| 9,285,016 B2 | 3/2016 | Beck et al. |
| 9,285,017 B2 | 3/2016 | Otake et al. |
| 2012/0302394 A1 | 11/2012 | Seo et al. |
| 2013/0190127 A1* | 7/2013 | Singh ........................ F16H 3/66 475/276 |
| 2014/0256500 A1* | 9/2014 | Mellet ....................... F16H 3/62 475/276 |
| 2015/0018159 A1 | 1/2015 | Otake et al. |
| 2017/0074363 A1* | 3/2017 | Park ......................... F16H 3/66 |
| 2017/0219060 A1* | 8/2017 | Hart ......................... F16H 3/66 |
| 2017/0268607 A1* | 9/2017 | Kwon ....................... F16H 3/66 |

* cited by examiner

FIG. 2

| Speed stage | Control element | | | | | | Gear ratio |
|---|---|---|---|---|---|---|---|
| | C1 | C2 | C3 | B1 | B2 | B3 | |
| D1 | | | ● | | ● | ● | 4.420 |
| D2 | ● | | | | ● | ● | 2.500 |
| D3 | ● | | ● | | | ● | 1.818 |
| D4 | ● | ● | | | | ● | 1.341 |
| D5 | ● | ● | ● | | | | 1.000 |
| D6 | ● | ● | | ● | | | 0.824 |
| D7 | | ● | ● | ● | | | 0.684 |
| D8 | | ● | ● | ● | | ● | 0.569 |
| D9 | | | ● | ● | | ● | 0.504 |
| REV | | ● | ● | | ● | | 3.400 |

PLANETARY GEAR TRAIN OF AN AUTOMATIC TRANSMISSION FOR A VEHICLE

CROSS-REFERENCE TO RELATED APPLICATION

This application claims priority to and the benefit of Korean Patent Application No. 10-2016-0032344 filed in the Korean Intellectual Property Office on Mar. 17, 2016, the entire contents of which are incorporated herein by reference.

BACKGROUND (a) Field of the Disclosure

The present disclosure relates to automatic transmissions for vehicles. More particularly, the present disclosure relates to a planetary gear train of an automatic transmission for a vehicle.

(b) Description of the Related Art

Recently, increasing oil prices have caused vehicle manufactures all over the world to rush into infinite competition. Particularly in the case of engines, manufactures have been pursuing efforts to reduce the weight and improve fuel efficiency of vehicles by reducing engine size and the like.

As a result, research into weight reduction and fuel efficiency enhancement through downsizing has been conducted in the field of engines. Research has also been conducted for simultaneously securing operability and fuel efficiency competitiveness through multiple speed stages in the field of automatic transmissions.

However, in an automatic transmission, as the number of speed stages increases, the number of internal components also increases. As a result, the automatic transmission may be difficult to mount, the manufacturing cost and weight may be increased, and power transmission efficiency may be deteriorated.

In recent years, 8-speed automatic transmissions have been implemented. Research and development of a planetary gear train capable of implementing more speed stages have also been actively conducted.

A conventional automatic transmission of eight or more speed stages typically includes three or four planetary gear sets and five or six control elements (frictional elements). Thus, mountability may deteriorate due to an increase in volume and weight of the transmission.

In this regard, disposing planetary gear sets in parallel or employing dog clutches instead of wet-type control elements have been attempted. However, such arrangements are not widely applicable, and using the dog clutches may deteriorate shift-feel.

The above information disclosed in this Background section is only to enhance understanding of the background of the disclosure. Therefore, the background may contain information that is not prior art that is already known in this country to a person of ordinary skill in the art.

SUMMARY

The present disclosure is directed to a planetary gear train of an automatic transmission for a vehicle. The disclosed planetary gear train improves power delivery performance and fuel efficiency by achieving at least nine forward speed stages and at least one reverse speed stage while using a minimum number of constituent elements. The disclosed planetary gear train also improves silent driving, i.e., reduces noise by using a driving point that is set at a low engine speed.

According to various aspects of the present disclosure, a planetary gear train of an automatic transmission for a vehicle may include: an input shaft receiving torque of an engine; an output shaft outputting the torque; a first planetary gear set including a first rotation element, a second rotation element, and a third rotation element; a second planetary gear set including a fourth rotation element, a fifth rotation element, and a sixth rotation element; a third planetary gear set including a seventh rotation element, an eighth rotation element, and a ninth rotation element; a fourth planetary gear set including a tenth rotation element, an eleventh rotation element, and a twelfth rotation element; a first shaft connected to the first rotation element; a second shaft connecting the second rotation element to the fourth rotation element and the seventh rotation element and connected to the input shaft; a third shaft connecting the third rotation element to the eleventh rotation element; a fourth shaft connecting the fifth rotation element to the twelfth rotation element and connected to the output shaft; a fifth shaft connected to the sixth rotation element and selectively connected to the third shaft; a sixth shaft connected to the eighth rotation element; a seventh shaft connected to the ninth rotation element; and an eighth shaft connected to the tenth rotation element, selectively connected to the sixth shaft, and selectively connected to the seventh shaft.

The first shaft, the third shaft, and the sixth shaft may be selectively connected to a transmission housing respectively.

The first rotation element, the second rotation element, and the third rotation element of the first planetary gear set may be a first sun gear, a first planet carrier, and a first ring gear, the fourth rotation element, the fifth rotation element, and the sixth rotation element of the second planetary gear set may be a second sun gear, a second planet carrier, and a second ring gear, the seventh rotation element, the eighth rotation element, and the ninth rotation element of the third planetary gear set may be a third sun gear, a third planet carrier, and a third ring gear, and the tenth rotation element, the eleventh rotation element, and the twelfth rotation element of the fourth planetary gear set may be a fourth sun gear, a fourth planet carrier, and a fourth ring gear.

The planetary gear train may further include: a first clutch selectively connecting the third shaft to the fifth shaft; a second clutch selectively connecting the sixth shaft to the eighth shaft; a third clutch selectively connecting the seventh shaft to the eighth shaft; a first brake selectively connecting the first shaft to the transmission housing; a second brake selectively connecting the third shaft to the transmission housing; and a third brake selectively connecting the sixth shaft to the transmission housing.

According to various aspects of the present disclosure, a planetary gear train of an automatic transmission for a vehicle may include: an input shaft receiving torque of an engine; an output shaft outputting the torque; a first planetary gear set including a first rotation element, a second rotation element, and a third rotation element; a second planetary gear set including a fourth rotation element, a fifth rotation element, and a sixth rotation element; a third planetary gear set including a seventh rotation element, an eighth rotation element, and a ninth rotation element; and a fourth planetary gear set including a tenth rotation element, an eleventh rotation element, and a twelfth rotation element, in which the input shaft may be directly connected to the second rotation element, the output shaft may be directly connected to the twelfth rotation element, the second rotation element may be directly connected to the fourth rotation element and the seventh rotation element, the third rotation element may be directly connected to the eleventh rotation element, the fifth rotation element may be directly connected to the twelfth rotation element, the sixth rotation element may be selectively connected to the third rotation element, and the tenth rotation element may be selectively connected to the eighth rotation element and may be selectively connected to the ninth rotation element.

The first rotation element, the eighth rotation element, and the eleventh rotation element may be selectively connected to a transmission housing respectively.

The first rotation element, the second rotation element, and the third rotation element of the first planetary gear set may be a first sun gear, a first planet carrier, and a first ring gear, the fourth rotation element, the fifth rotation element, and the sixth rotation element of the second planetary gear set may be a second sun gear, a second planet carrier, and a second ring gear, the seventh rotation element, the eighth rotation element, and the ninth rotation element of the third planetary gear set may be a third sun gear, a third planet carrier, and a third ring gear, and the tenth rotation element, the eleventh rotation element, and the twelfth rotation element of the fourth planetary gear set may be a fourth sun gear, a fourth planet carrier, and a fourth ring gear.

The planetary gear train may further include: a first clutch selectively connecting the third rotation element to the sixth rotation element; a second clutch selectively connecting the eighth rotation element to the tenth rotation element; a third clutch selectively connecting the ninth rotation element to the tenth rotation element; a first brake selectively connecting the first rotation element to the transmission housing; a second brake selectively connecting the eleventh rotation element to the transmission housing; and a third brake selectively connecting the eighth rotation element to the transmission housing.

Various embodiments of the present disclosure may achieve at least nine forward speed stages and at least one reverse speed stage by combining four planetary gear sets with six control elements.

A speed stage that is suitable to an engine speed may be achieved due to multiple speed stages and a driving point that is set at a low engine speed may be used. As a result, silent driving or noise reduction may be improved.

In addition, engine driving efficiency may be maximized by achieving multiple speed stages. Also, power delivery performance and fuel efficiency may be improved.

Further, the effects which may be obtained or predicted by the embodiments of the present disclosure are directly or implicitly disclosed in the detailed description of the embodiments of the present disclosure. In other words, various effects which are predicted by the embodiments of the present disclosure are described in the detailed description below.

BRIEF DESCRIPTION OF THE DRAWINGS

FIG. 2 is an operation chart of control elements at each speed stage in a planetary gear train according to various embodiments of the present disclosure.

DETAILED DESCRIPTION OF THE EMBODIMENTS

Figure 1:
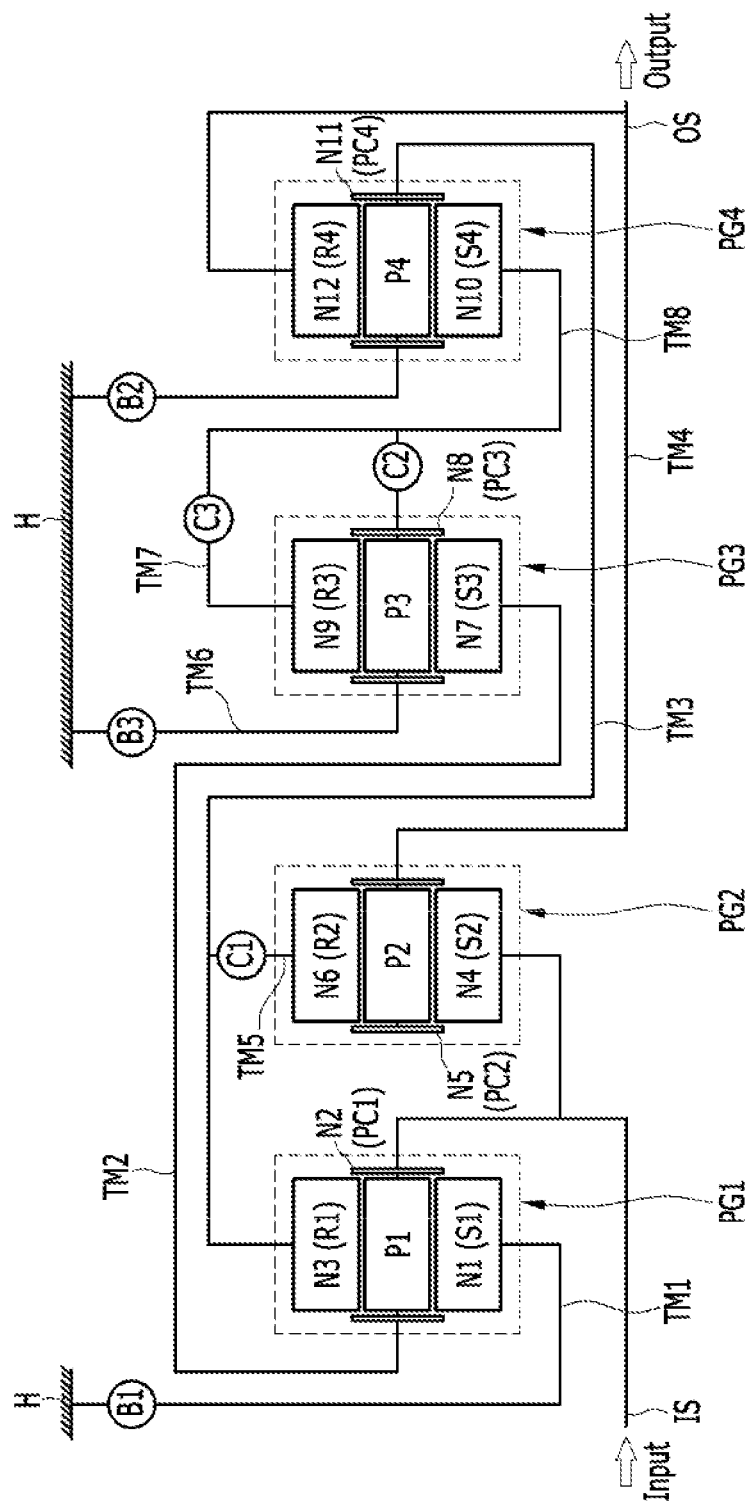
FIG. 1 is a schematic diagram of a planetary gear train according to various embodiments of the present disclosure.

It is desired to develop a planetary gear train, which may improve or bring about maximum efficiency with a small number of components in order to increase fuel efficiency through multiple speed stages or gear shifts. In this aspect, the present disclosure relates to a planetary gear train of an automatic transmission for a vehicle. The disclosed planetary gear train may improve power delivery performance and reduce fuel consumption by achieving at least nine forward speeds using a minimum number of constituent elements. The disclosed planetary gear train may also improve silent driving or reduce noise by using a driving point that is set at a low engine speed.

Hereinafter, one embodiment of the present disclosure is described in detail with reference to the accompanying drawings. In the drawings, the following symbols are used to identify various elements of the disclosed embodiments, wherein:

i) B1, B2, B3 represent first, second, and third brakes;
ii) C1, C2, C3 represent first, second, and third clutches;
iii) PG1, PG2, PG3, PG4 represent first, second, third, and fourth planetary gear sets;
iv) S1, S2, S3, S4 represent first, second, third, and fourth sun gears;
v) PC1, PC2, PC3, PC4 represent first, second, third, and fourth planet carriers;
vi) R1, R2, R3, R4 represent first, second, third, and fourth ring gears;
vii) IS represents an input shaft;
viii) OS represents an output shaft; and
ix) TM1, TM2, TM3, TM4, TM5, TM6, TM7, TM8 represent first, second, third, fourth, fifth, sixth, seventh, and eighth shafts.

However, parts that are not related with the description are omitted for clearly describing the embodiments of the present disclosure. Also, like reference numerals refer to like or similar elements throughout the specification.

In the following description, using names or terms to identify components such as first, second, third, and the like is to differentiate the names because the names of the components are otherwise the same as each other. Such a naming convention is not intended to denote or set an order thereof and the disclosure is not intended to be so limited.

FIG. 1 is a schematic diagram of a planetary gear train according to various embodiments of the present disclosure.

Referring to FIG. 1, a planetary gear train according to various embodiments of the present disclosure includes first, second, third, and fourth planetary gear sets PG1, PG2, PG3, and PG4 disposed on the same axis. In one embodiment, the planetary gear train also includes an input shaft IS, an output shaft OS, eight shafts TM1-TM8 connected to at least one rotation element of the first, second, third, and fourth planetary gear sets PG1, PG2, PG3, and PG4, six control elements C1 to C3 and B1 to B3, and a transmission housing H.

Torque produced by an engine and transmitted from the input shaft IS is changed by cooperation of the first, second, third, and fourth planetary gear sets PG1, PG2, PG3, and PG4. The changed torque is output through the output shaft OS.

In this embodiment, the planetary gear sets PG1, PG2, PG3, and PG4 are arranged in a sequence of the first, second, third, and fourth planetary gear sets PG1, PG2, PG3, and PG4 from an engine side.

The input shaft IS is an input member. Power from a crankshaft of the engine is torque-converted through a torque converter to be input to the input shaft IS.

The output shaft OS is an output member. The output shaft OS is disposed in parallel with the input shaft IS and transmits driving torque to a driving wheel through a differential apparatus.

In this embodiment, the first planetary gear set PG1 is a single pinion planetary gear set. The first planetary gear set PG1 includes a first sun gear S1, a first planet carrier PC1 rotatably supporting a first pinion gear P1 externally meshed with the first sun gear S1, and a first ring gear R1 internally meshed with the first pinion gear P1, respectively, as first, second, and third rotation elements N1, N2, and N3.

In this embodiment, the second planetary gear set PG2 is a single pinion planetary gear set. The second planetary gear set PG2 includes a second sun gear S2, a second planet carrier PC2 rotatably supporting a second pinion gear P2 externally meshed with the second sun gear S2, and a second ring gear R2 internally meshed with the second pinion gear P2, respectively, as fourth, fifth, and sixth rotation elements N4, N5, and N6.

In this embodiment, the third planetary gear set PG3 is a single pinion planetary gear set. The third planetary gear set PG3 includes a third sun gear S3, a third planet carrier PC3 rotatably supporting a third pinion gear P3 externally meshed with the third sun gear S3, and a third ring gear R3 internally meshed with the third pinion gear P3, respectively, as seventh, eighth, and ninth rotation elements N7, N8, and N9.

In this embodiment, the fourth planetary gear set PG4 is a single pinion planetary gear set. The fourth planetary gear set PG4 includes a fourth sun gear S4, a fourth planet carrier PC4 rotatably supporting a fourth pinion gear P4 externally meshed with the fourth sun gear S4, and a fourth ring gear R4 internally meshed with the fourth pinion gear P4, respectively, as tenth, eleventh, and twelfth rotation elements N10, N11, and N12.

In this embodiment, the second rotation element N2 is directly connected to the fourth rotation element N4 and the seventh rotation element N7. The third rotation element N3 is directly connected to the eleventh rotation element N11. The fifth rotation element N5 is directly connected to the twelfth rotation element N12. The first, second, third, and fourth planetary gear sets PG1, PG2, PG3, and PG4 are operated with eight shafts TM1-TM8.

The eight shafts TM1-TM8 are described in further detail below.

Each of eight shafts TM1-TM8 may directly connect at least one rotation element to another element, may be a rotational element member rotating with at least one rotation element, or may be a fixed member fixed to the transmission housing H.

In this embodiment, the first shaft TM1 is connected to the first sun gear S1. The first shaft TM1 is also selectively connected to the transmission housing H to be operated as a selective fixed element.

In this embodiment, the second shaft TM2 directly connects the first planet carrier PC1 to the second sun gear S2 and the third sun gear S3. The second shaft TM2 is also directly connected to the input shaft IS to be continuously operated as an input element.

In this embodiment, the third shaft TM3 directly connects the first ring gear R1 to the fourth planet carrier PC4. The third shaft TM3 is also selectively connected to the transmission housing H to be operated as a selective fixed element.

In this embodiment, the fourth shaft TM4 directly connects the second planet carrier PC2 to the fourth ring gear R4. The fourth shaft TM4 is also directly connected to the output shaft OS to be continuously operated as an output element.

In this embodiment, the fifth shaft TM5 is connected to the second ring gear R2. The fifth shaft TM5 is also selectively connected to the third shaft TM3.

In this embodiment, the sixth shaft TM6 is connected to the third planet carrier PC3. The sixth shaft TM6 is also selectively connected to the transmission housing H to be operated as a selective fixed element.

In this embodiment, the seventh shaft TM7 is connected to the third ring gear R3.

In this embodiment, the eighth shaft TM8 is connected to the fourth sun gear S4. The eighth shaft TM8 is also selectively connected to the sixth shaft TM6. The eighth shaft TM8 is also selectively connected to the seventh shaft TM7.

In addition, in this embodiment, three clutches C1, C2, and C3, which are control elements, are disposed at connection portions between any two shafts among the eight shafts TM1-TM8.

In addition, in this embodiment, three brakes B1, B2, and B3, which are control elements, are disposed at connection portions between any one shaft among the eight shafts TM1-TM8 and the transmission housing H.

The three clutches C1-C3 and the three brakes B1-B3 are described in further detail below.

In this embodiment, the first clutch C1 is disposed between the third shaft TM3 and the fifth shaft TM5. The first clutch C1 causes the third shaft TM3 and the fifth shaft TM5 to integrally rotate with each other.

In this embodiment, the second clutch C2 is disposed between the sixth shaft TM6 and the eighth shaft TM8. The second clutch C2 causes the sixth shaft TM6 and the eighth shaft TM8 to integrally rotate each other.

In this embodiment, the third clutch C3 is disposed between the seventh shaft TM7 and the eighth shaft TM8. The third clutch C3 causes the seventh shaft TM7 and the eighth shaft TM8 to integrally rotate each other.

In this embodiment, the first brake B1 is disposed between the first shaft TM1 and the transmission housing H. The first brake B1 causes the first shaft TM1 to be operated as the selective fixed element.

In this embodiment, the second brake B2 is disposed between the third shaft TM3 and the transmission housing H. The second brake B2 causes the third shaft TM3 to be operated as the selective fixed element.

In this embodiment, the third brake B3 is disposed between the sixth shaft TM6 and the transmission housing H. The third brake B3 causes the sixth shaft to be operated as the selective fixed element.

The control elements including the first, second, and third clutches C1, C2, and C3 and the first, second, and third brakes B1, B2, and B3 may be multi-plate friction elements of a wet type that are operated by hydraulic pressure.

FIG. 2 is an operation chart of the control elements at each speed stage in the planetary gear train according to various embodiments of the present disclosure.

Referring to FIG. 2, three control elements are operated at each speed stage in the planetary gear train according to various embodiments of the present disclosure. Shifting processes in the various embodiments of the present disclosure are described in further detail below.

In this embodiment, the third clutch C3 and the second and third brakes B2 and B3 are operated at a first forward speed stage D1.

Torque of the input shaft IS is input to the second shaft TM2 in a state where the seventh shaft TM7 is connected to the eighth shaft TM8 by the operation of the third clutch C3. In addition, the third shaft TM3 and the sixth shaft TM6 are operated as the fixed element by operation of both the second and third brakes B2 and B3. In this arrangement, the first forward speed stage D1 is achieved and a changed torque is output through the output shaft OS connected to the fourth shaft TM4.

In this embodiment, the first clutch C1 and the second and the third brakes B2 and B3 are operated at a second forward speed stage D2.

Torque of the input shaft IS is input to the second shaft TM2 in a state where the third shaft TM3 is connected to the fifth shaft TM5 by the operation of the first clutch C1. In addition, the third shaft TM3 and the sixth shaft TM6 are operated as the fixed element by operation of both the second and third brakes B2 and B3. In this arrangement, the second forward speed stage D2 is achieved and a changed torque is output through the output shaft OS connected to the fourth shaft TM4.

In this embodiment, the first and third clutches C1 and C3 and the third brake B3 are operated at a third forward speed stage D3.

Torque of the input shaft IS is input to the second shaft TM2 in a state where the third shaft TM3 is connected to the fifth shaft TM5 by the operation of the first clutch C1 and where the seventh shaft TM7 is connected to the eighth shaft TM8 by the operation of the third clutch C3. In addition, the sixth shaft TM6 is operated as the fixed element by operation of the third brake B3. In this arrangement, the third forward speed stage is achieved and a changed torque is output through the output shaft OS connected to the fourth shaft TM4.

In this embodiment, the first and second clutches C1 and C2 and the third brake B3 are operated at a fourth forward speed stage D4.

Torque of the input shaft IS is input to the second shaft TM2 in a state where the third shaft TM3 is connected to the fifth shaft TM5 by the operation of the first clutch C1 and where the sixth shaft TM6 is connected to the eighth shaft TM8 by the operation of the second clutch C2. In addition, the sixth shaft TM6 is operated as the fixed element by operation of the third brake B3. In this arrangement, the fourth forward speed stage D4 is achieved and a changed torque is output through the output shaft OS connected to the fourth shaft TM4.

In this embodiment, the first, second, and third clutches C1, C2, and C3 are operated at a fifth forward speed stage D5.

Torque of the input shaft IS is input to the second shaft TM2 in a state where the third shaft TM3 is connected to the fifth shaft TM5 by operation of the first clutch C1, where the sixth shaft TM6 is connected to the eighth shaft TM8 by operation of the second clutch C2, and where the seventh shaft TM7 is connected to the eighth shaft TM8 by operation of the third clutch C3. In this arrangement, the first, second, third, and fourth planetary gear sets PG1, PG2, PG3, and PG4 integrally rotate and the fifth forward speed stage D5 is achieved. At the fifth forward speed stage D5, rotation speed that is output through the output shaft OS is the same as that of the input shaft Is.

In this embodiment, the first and second clutches C1 and C2 and the first brake B1 are operated at a sixth forward speed D6.

Torque of the input shaft IS is input to the second shaft TM2 in a state where the third shaft TM3 is connected to the fifth shaft TM5 by the operation of the first clutch C1 and where the sixth shaft TM6 is connected to the eighth shaft TM8 by the operation of the second clutch C2. In addition, the first shaft TM1 is operated as the fixed element by operation of the first brake B1. In this arrangement, the sixth forward speed stage D6 is achieved and a changed torque is output through the output shaft OS connected to the fourth shaft TM4.

In this embodiment, the second and third clutches C2 and C3 and the first brake B1 are operated at a seventh forward speed stage D7.

Torque of the input shaft IS is input to the second shaft TM2 in a state where the sixth shaft TM6 is connected to the eighth shaft TM8 by operation of the second clutch C2 and where the seventh shaft TM7 is connected to the eighth shaft TM8 by operation of the third clutch C3. In addition, the first shaft TM1 is operated as the fixed element by operation of the first brake B1. In this arrangement, the seventh forward speed stage D7 is achieved and a changed torque is output through the output shaft OS connected to the fourth shaft TM4.

In this embodiment, the second clutch C2 and the first and third brakes B1 and B3 are operated at an eighth forward speed stage D8.

Torque of the input shaft IS is input to the second shaft TM2 in a state where the sixth shaft TM6 is connected to the eighth shaft TM8 by operation of the second clutch C2. In addition, the first shaft TM1 and the sixth shaft TM6 are operated as the fixed elements by operation of both the first and third brakes B1 and B3. In this arrangement, the eighth forward speed D8 is achieved and a changed torque is output through the output shaft OS connected to the fourth shaft TM4.

In this embodiment, the third clutch C3 and the first and third brakes B1 and B3 are operated at a ninth forward speed stage D9.

Torque of the input shaft IS is input to the second shaft TM2 in a state where the seventh shaft TM7 is connected to the eighth shaft TM8 by operation of the third clutch C3. In addition, the first shaft TM1 and the sixth shaft TM6 are operated as the fixed elements by operation of both the first and third brakes B1 and B3. In this arrangement, the ninth forward speed stage D9 is achieved and a changed torque is output through the output shaft OS connected to the fourth shaft TM4.

In this embodiment, the second and third clutches C2 and C3 and the second brake B2 are operated at a reverse speed stage REV.

Torque of the input shaft IS is input to the second shaft TM2 in a state where the sixth shaft TM6 is connected to the eighth shaft TM8 by operation of the second clutch C2 and where the seventh shaft TM7 is connected to the eighth shaft TM8 by operation of the third clutch C3. In addition, the third shaft TM3 is operated as the fixed element by operation of the second brake B2. In this arrangement, the reverse speed stage REV is achieved and a changed torque is output through the output shaft OS connected to the fourth shaft TM4.

The planetary gear train according to the various embodiments of the present disclosure may achieve at least nine forward speed stages and at least one reverse speed stage by control of the four planetary gear sets PG1-PG4, three clutches C1-C3, and three brakes B1-B3.

Since a speed stage that is suitable for an engine speed may be achieved due to multiple speed stages and because a driving point set at a low engine speed may be used, silent driving or reduced noise may be implemented.

In addition, engine driving efficiency may be maximized by achieving multiple speed stages. Further, power delivery performance and fuel efficiency may be improved.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
    an input shaft receiving torque of an engine;
    an output shaft outputting an output torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    a first shaft connected to the first rotation element;
    a second shaft connecting the second rotation element to the fourth rotation element and the seventh rotation element and connected to the input shaft;
    a third shaft connecting the third rotation element to the eleventh rotation element;
    a fourth shaft connecting the fifth rotation element to the twelfth rotation element and connected to the output shaft;
    a fifth shaft connected to the sixth rotation element and selectively connected to the third shaft;
    a sixth shaft connected to the eighth rotation element;
    a seventh shaft connected to the ninth rotation element; and
    an eighth shaft connected to the tenth rotation element, selectively connected to the sixth shaft, and selectively connected to the seventh shaft.

2. The planetary gear train of claim 1, wherein the first shaft, the third shaft, and the sixth shaft are each selectively connected to a transmission housing.

3. The planetary gear train of claim 2, wherein the first, second, third, and fourth planetary gear sets are arranged in a sequence of the first, second, third, and fourth planetary gear sets from an engine side.

4. The planetary gear train of claim 1, wherein the first, second, third, and fourth planetary gear sets are arranged in a sequence of the first, second, third, and fourth planetary gear sets from an engine side.

5. The planetary gear train of claim 1, wherein the first rotation element, the second rotation element, and the third rotation element of the first planetary gear set are a first sun gear, a first planet carrier, and a first ring gear,
    the fourth rotation element, the fifth rotation element, and the sixth rotation element of the second planetary gear set are a second sun gear, a second planet carrier, and a second ring gear,
    the seventh rotation element, the eighth rotation element, and the ninth rotation element of the third planetary gear set are a third sun gear, a third planet carrier, and a third ring gear, and
    the tenth rotation element, the eleventh rotation element, and the twelfth rotation element of the fourth planetary gear set are a fourth sun gear, a fourth planet carrier, and a fourth ring gear.

6. The planetary gear train of claim 2, further comprising:
    a first clutch selectively connecting the third shaft to the fifth shaft;
    a second clutch selectively connecting the sixth shaft to the eighth shaft;
    a third clutch selectively connecting the seventh shaft to the eighth shaft;
    a first brake selectively connecting the first shaft to the transmission housing;
    a second brake selectively connecting the third shaft to the transmission housing; and
    a third brake selectively connecting the sixth shaft to the transmission housing.

7. The planetary gear train of claim 6, wherein the first, second, third, and fourth planetary gear sets are arranged in a sequence of the first, second, third, and fourth planetary gear sets from an engine side.

8. The planetary gear train of claim 1, further comprising:
    a first clutch selectively connecting the third shaft to the fifth shaft;
    a second clutch selectively connecting the sixth shaft to the eighth shaft; and
    a third clutch selectively connecting the seventh shaft to the eighth shaft.

9. The planetary gear train of claim 8, further comprising:
    a first brake selectively connecting the first shaft to a transmission housing;
    a second brake selectively connecting the third shaft to the transmission housing; and
    a third brake selectively connecting the sixth shaft to the transmission housing.

10. The planetary gear train of claim 1, further comprising:
    a first brake selectively connecting the first shaft to a transmission housing;
    a second brake selectively connecting the third shaft to the transmission housing; and
    a third brake selectively connecting the sixth shaft to the transmission housing.

11. A planetary gear train of an automatic transmission for a vehicle, the planetary gear train comprising:
    an input shaft receiving torque of an engine;
    an output shaft outputting an output torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element; and
    a fourth planetary gear set including a tenth rotation element, an eleventh rotation element, and a twelfth rotation element,
    wherein the input shaft is directly connected to the second rotation element,
    the output shaft is directly connected to the twelfth rotation element,
    the second rotation element is directly connected to the fourth rotation element and the seventh rotation element,
    the third rotation element is directly connected to the eleventh rotation element, the fifth rotation element is directly connected to the twelfth rotation element, the sixth rotation element is selectively connected to the third rotation element, and the tenth rotation element is selectively connected to the eighth rotation element and is selectively connected to the ninth rotation element.

12. The planetary gear train of claim 11, wherein the first rotation element, the eighth rotation element, and the eleventh rotation element are each selectively connected to a transmission housing.

13. The planetary gear train of claim 12, wherein the first, second, third, and fourth planetary gear sets are arranged in a sequence of the first, second, third, and fourth planetary gear sets from an engine side.

14. The planetary gear train of claim 11, wherein the first, second, third, and fourth planetary gear sets are arranged in a sequence of the first, second, third, and fourth planetary gear sets from an engine side.

15. The planetary gear train of claim 11, wherein the first rotation element, the second rotation element, and the third rotation element of the first planetary gear set are a first sun gear, a first planet carrier, and a first ring gear, the fourth rotation element, the fifth rotation element, and the sixth rotation element of the second planetary gear set are a second sun gear, a second planet carrier, and a second ring gear, the seventh rotation element, the eighth rotation element, and the ninth rotation element of the third planetary gear set are a third sun gear, a third planet carrier, and a third ring gear, and the tenth rotation element, the eleventh rotation element, and the twelfth rotation element of the fourth planetary gear set are a fourth sun gear, a fourth planet carrier, and a fourth ring gear.

16. The planetary gear train of claim 12, further comprising:

a first clutch selectively connecting the third rotation element to the sixth rotation element;

a second clutch selectively connecting the eighth rotation element to the tenth rotation element;

a third clutch selectively connecting the ninth rotation element to the tenth rotation element;

a first brake selectively connecting the first rotation element to the transmission housing;

a second brake selectively connecting the eleventh rotation element to the transmission housing; and a third brake selectively connecting the eighth rotation element to the transmission housing.

17. The planetary gear train of claim 16, wherein the first, second, third, and fourth planetary gear sets are arranged in a sequence of the first, second, third, and fourth planetary gear sets from an engine side.

18. The planetary gear train of claim 11, further comprising:

a first clutch selectively connecting the third rotation element to the sixth rotation element;

a second clutch selectively connecting the eighth rotation element to the tenth rotation element; and a third clutch selectively connecting the ninth rotation element to the tenth rotation element.

19. The planetary gear train of claim 18, further comprising:

a first brake selectively connecting the first rotation element to a transmission housing;

a second brake selectively connecting the eleventh rotation element to the transmission housing; and a third brake selectively connecting the eighth rotation element to the transmission housing.

20. The planetary gear train of claim 11, further comprising:

a first brake selectively connecting the first rotation element to a transmission housing;

a second brake selectively connecting the eleventh rotation element to the transmission housing; and a third brake selectively connecting the eighth rotation element to the transmission housing.

* * * * *